US006361664B1

(12) United States Patent
Fader et al.

(10) Patent No.: US 6,361,664 B1
(45) Date of Patent: Mar. 26, 2002

(54) METHOD OF REDUCING CORROSION WITH ELECTRICAL CHARGE

(75) Inventors: Joe Fader, Brighton, MI (US); Jim Hawkins, Madison, AL (US); Steve Yollick; Chris Keeney, both of Troy, MI (US); Mark Clements, Lapeer, MI (US)

(73) Assignee: Meritor Suspension Systems Company (CA)

( * ) Notice: Subject to any disclaimer, the term of this patent is extended or adjusted under 35 U.S.C. 154(b) by 0 days.

(21) Appl. No.: 09/643,805

(22) Filed: Aug. 22, 2000

(51) Int. Cl.⁷ .................................................. C23F 13/00
(52) U.S. Cl. .............................. 204/196.11; 204/196.26; 280/5.5; 280/5.52; 340/500; 340/501; 267/195; 267/196; 267/198; 267/201; 267/202; 267/214; 267/216
(58) Field of Search ................................. 280/5.5, 5.52; 340/500, 501; 267/195, 196, 198, 201, 202, 214, 216; 204/196.11, 196.26

(56) References Cited

U.S. PATENT DOCUMENTS

| 4,828,665 A | * | 5/1989 | McCready | 204/196.26 |
| 5,102,514 A | * | 4/1992 | McCready | 204/196.26 |
| 5,390,949 A | | 2/1995 | Naganathan et al. | |
| 5,570,286 A | | 10/1996 | Margolis et al. | |

FOREIGN PATENT DOCUMENTS

| BE | 881528 | 5/1980 |
| DE | 4033647 A1 | 4/1992 |
| EP | 0872577 A1 | 10/1998 |
| GB | 2140457 | 11/1984 |
| JP | 07264708 | 10/1995 |
| WO | WO 8804334 | 6/1988 |

OTHER PUBLICATIONS

Search Report, dated Oct. 19, 2001.

* cited by examiner

*Primary Examiner*—Bruce F. Bell
(74) *Attorney, Agent, or Firm*—Carlson, Gaskey & Olds, PC

(57) ABSTRACT

A vehicle system component is provided with an electrical charge to resist corrosion. Preferably, the electrical charge is generated by movement of components adjacent to the suspension component. Friction surfaces may be placed in contact with each other such that and heat is generated upon movement of the vehicle system components. The heat is transferred into electrical energy. In another embodiment, an electrical coil receives a magnetic member which moves within the coil to generate the current. The charge may be stored in a capacitor and periodically dispatched onto said component. The invention thus provides a low cost and simplistic way of resisting corrosion to vehicle components, and in particular to vehicle suspension components.

16 Claims, 2 Drawing Sheets

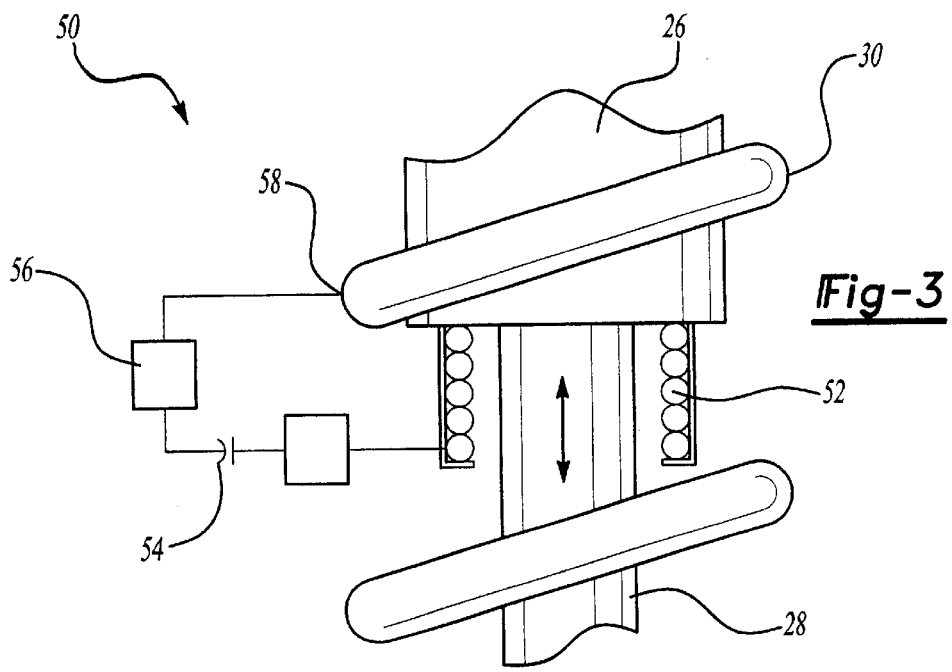
*Fig-3*
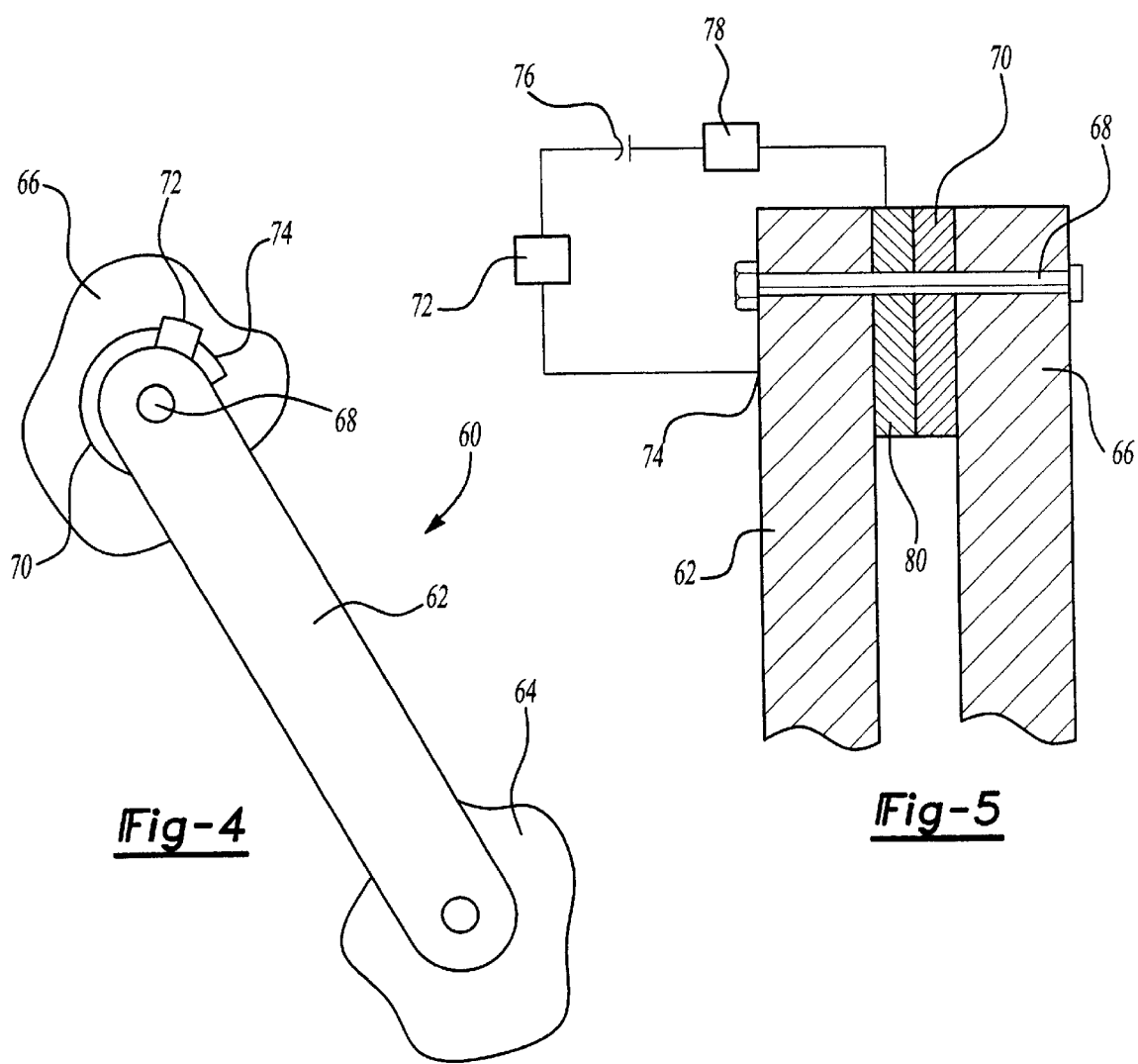
*Fig-4*
*Fig-5*

METHOD OF REDUCING CORROSION WITH ELECTRICAL CHARGE

BACKGROUND OF THE INVENTION

This invention relates to a system for electrically charging a vehicle component, wherein the electrical charge is generated by movement of components on the vehicle.

Modern vehicles have a number of components mounted in positions where they are exposed to the environment. In particular, there are components mounted beneath the frame of the vehicle which are subject to dirt, grime, rain, snow, etc. As examples, all of the suspension components for a vehicle are mounted beneath the frame of the vehicle. All of these components are thus subject to corrosion.

In the past, complex and expensive surface treatments have been relied upon to resist corrosion. Many of the components are inexpensive, and thus expensive treatments are not always practical. It would be desirable to reduce the complexity and cost of the anti-corrosion treatments. On the other hand, any solution to the problem of corrosion must be relatively inexpensive to be practical.

SUMMARY OF THE INVENTION

In a disclosed embodiment of this invention, an electrical charge is placed on a vehicle component which is subject to corrosion. The electrical charge is of very low voltage, and thus does not raise any significant safety issues. However, the electrical charge does resist corrosion. It is preferred that the vehicle component be a suspension component, and more particularly a suspension component made of steel. Such components have been subject to corrosion in the past, and the use of the electrical charge to resist the corrosion provides valuable benefits.

In a most preferred embodiment of this invention, the electrical charge is generated by movement of components on the vehicle. Preferably, the current is stored in a capacitor, and is periodically discharged. In this way, only a few relatively inexpensive electrical circuit elements must be included to provide the anti-corrosion function.

In one embodiment of this invention, friction surfaces are placed at a location such that during operation of the vehicle suspension, the friction surfaces will be moved along each other. Heat will be generated. Some method of transferring the heat into electrical energy is utilized. In one embodiment, a thermocouple is utilized to generate electric current from the heat. The current from the thermocouple is stored in a capacitor. A switch periodically discharges the capacitor charge to a component which is subject to corrosion. The switch may be designed such that it discharges with a time cycle, or discharges when a particular amount of charge has been stored in the capacitor.

In a second embodiment of this invention, a moving ferrous component moves within an electrical coil. Movement of the component within the coil generates a current. That current is utilized in a fashion similar to that of the above embodiment to generate a charge on the vehicle component.

These and other objects of the present invention can be best understood from the following specification and drawings, the following of which is a brief description.

BRIEF DESCRIPTION OF THE DRAWINGS

FIG. 3 shows an other embodiment.

FIG. 4 shows a third embodiment.

FIG. 5 is a detailed cross-sectional view through a portion of the FIG. 4 embodiment.

DETAILED DESCRIPTION OF A PREFERRED EMBODIMENT

Figure 1:
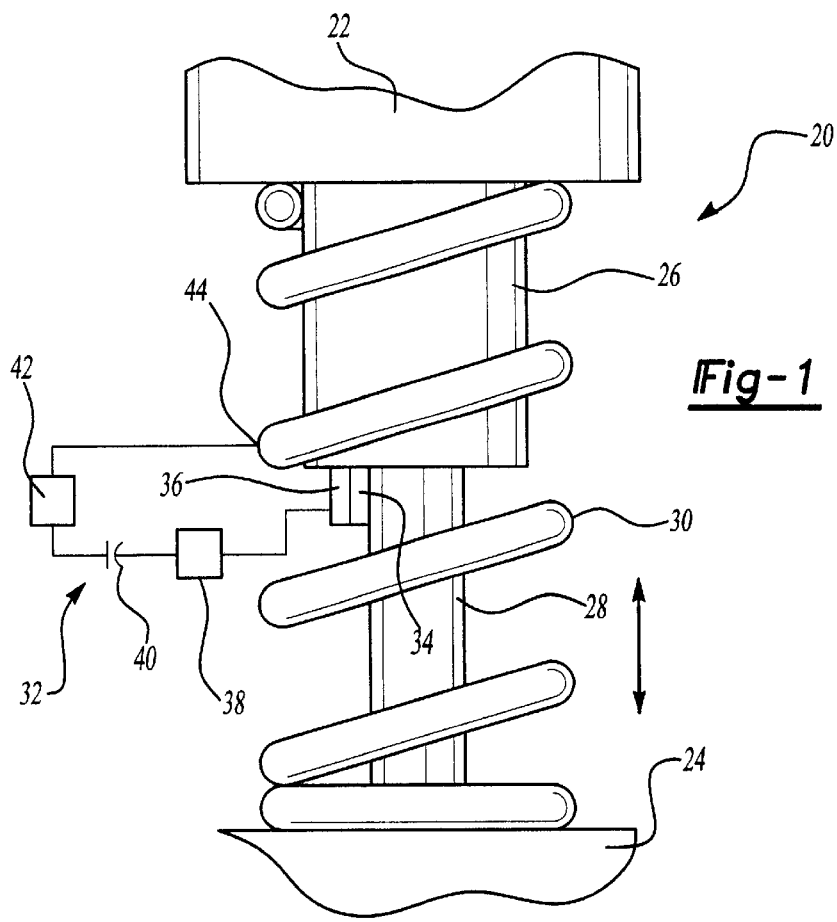
FIG. 1 is a schematic view of a first embodiment according to this invention.

A first embodiment vehicle suspension component 20 is illustrated in FIG. 1. A vehicle frame member 22 is connected to an axle portion 24 through a shock absorber 25. As known, a shock absorber 25 consists of a first large portion 26, with a smaller portion 28 received for telescopic movement within the first portion 26. A coil spring 30 extends along the length of the components 26 and 28 to resist movement, and to return the two portions to a "free" position. Should a shock be transmitted to the component 24, the member 28 moves within the member 26 to absorb the shock.

A system 32 is utilized to generate electrical charge when the portion 28 moves within the portion 26. In one embodiment, a friction surface 34 is placed on the component 28 and a second friction surface 36 is placed inside the inner bore of the portion 26. As component 28 and surface 34 move along surface 36, heat is generated. A electrical circuit element 38, which may be a thermocouple, receives heat from the friction surfaces. Element 38 creates an electric current which is stored in a capacitor 40. A switching element 42 periodically discharges the capacitor charge to a connection 44 to the coil spring 30. The element 42 may be of any appropriate design, and may serve to periodically discharge the capacitor with a time cycle, or may discharge the capacitor when a particular charge is stored at the capacitor. In this way, a relatively low voltage charge is periodically transmitted to the coil spring 30. The charge on the coil spring 30 resists corrosion. While the charge is shown applied to the coil spring, the charge could also be applied to the components 26 or 28. Further, other vehicle suspension components, and even non-suspension components would benefit from this invention.

Figure 2:
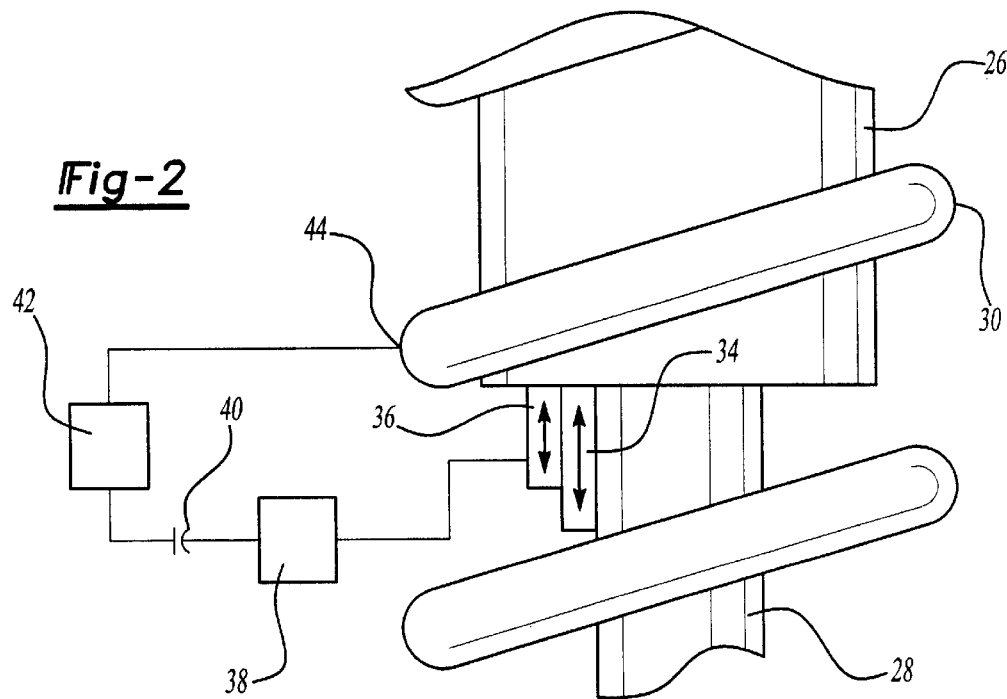
FIG. 2 is a partial schematic view of the FIG. 1 embodiment.

FIG. 2 is an enlarged view showing details of the friction portions 36 and 34, and the thermocouple 38. As can be appreciated, the friction surface on one of the two parts 26 and 28 may extend for a greater distance than the other, such that there is frictional contact throughout the entire stroke of movement.

FIG. 3 shows another embodiment 50. In embodiment 50, an electromagnetic coil 52 extends downwardly from portion 26. The portion 28 is ferrous based, at least in the vicinity of the part which will move within the coil 52. A charge is thus generated during such movement and stored in the capacitor 54. The details of such a generator and appropriate controls, etc. are within the skill of a worker in this art. A switching circuit 56 acts as in the above embodiment to periodically transmit a charge to the coil spring 30 at connection 58. Again, while the embodiment is shown on a shock absorber, other suspension components and even non-suspension components would benefit from this invention.

FIG. 4 shows an embodiment 60 wherein a moving suspension bar 62 connects a frame portion 64 to a second portion 66 of the vehicle. Again, this arrangement is shown schematically; however, bar 62 is pivotally connected at 68 to the component 66. This is exemplary of many types of suspension bars which provide increased stability. The surface 66 is provided with friction material 70. A switching circuit 72 is connected to a friction surface on the bar 62 (see FIG. 5) and periodically discharges a charge to a connection 74 on the bar 62.

As can be appreciated from FIG. 5, the surface 70 is in contact with the surface 80 on the bar 62. Thus, when the bar 62 pivots relative to the surface 66, heat is generated at the surface 80. That heat is transmitted by a thermocouple 78 to be stored in a capacitor 76. Again, the circuit 72 periodically discharges an electrical charge to the component 62.

As in all of the embodiments, the electrical charge being applied to the suspension component resists corrosion at the component. In this way, a relatively low cost electric circuit provides corrosion resistance over the life of the component. No complex or expensive coating processes are necessary. The circuits are all shown somewhat schematically. Also, the various components are shown positioned to be understood. In practice, the components would preferably be positioned to be protected. Based on this disclosure, a worker in this art would be able to design appropriate circuits and controls, etc. to achieve the goals of this invention.

Although preferred embodiments of this invention have been disclosed, a worker in this art would recognize that modifications would come within the scope of this invention. For that reason, the following claims should be studied to determine the true scope and content of this invention.

What is claimed is:

1. A vehicle suspension system comprising:
   a suspension component connected to be connected to a vehicle; and
   a circuit for discharging an electrical charge onto said component.

2. A system as recited in claim 1, wherein said electrical charge is generated by movement of components on the vehicle.

3. A system as recited in claim 2, wherein a friction surface is formed on a moving component which is moved along a second friction surface during said movement, said movement of said friction surface generating said electrical charge, and said electrical charge being periodically discharged onto said component.

4. A system as recited in claim 3, wherein said suspension component is a coil spring.

5. A system as recited in claim 3, wherein said moving components are distinct from said suspension component which receives said electrical charge.

6. A system as recited in claim 5, wherein said suspension and moving components are a portion of a shock absorber.

7. A system as recited in claim 3, wherein said moving component is also said suspension component which receives said electrical charge.

8. A system as recited in claim 7, wherein said moving component is a bar which pivots relative to a portion of said vehicle.

9. A system as recited in claim 3, wherein a thermocouple transfers heat from said friction surfaces into an electrical charge.

10. A system as recited in claim 9, wherein said thermocouple sends a current to a capacitor where it is stored, said capacitor sending energy to said suspension component.

11. A system as recited in claim 10, wherein a switching circuit periodically dissipates said capacitor onto said suspension component.

12. A system as recited in claim 1, wherein a moving component moves within an electrical coil to generate said electrical charge.

13. A system as recited in claim 12, wherein said moving component is distinct from said suspension component which receives said charge.

14. A system as recited in claim 13, wherein said suspension component which receives said charge is a coil spring, and said moving component is a portion of a shock absorber.

15. A vehicle component comprising:
    a first component otherwise subject to corrosion;
    at least one moving part, and an electrical circuit to generate an electric charge upon movement of said at least one moving part; and
    a connection to connect said electrical charge to said first component.

16. A component as recited in claim 15, wherein said first component is a vehicle suspension component.

* * * * *